Sept. 17, 1935.　　　　G. A. LYON　　　　2,014,655
TIRE COVER
Filed Sept. 14, 1932
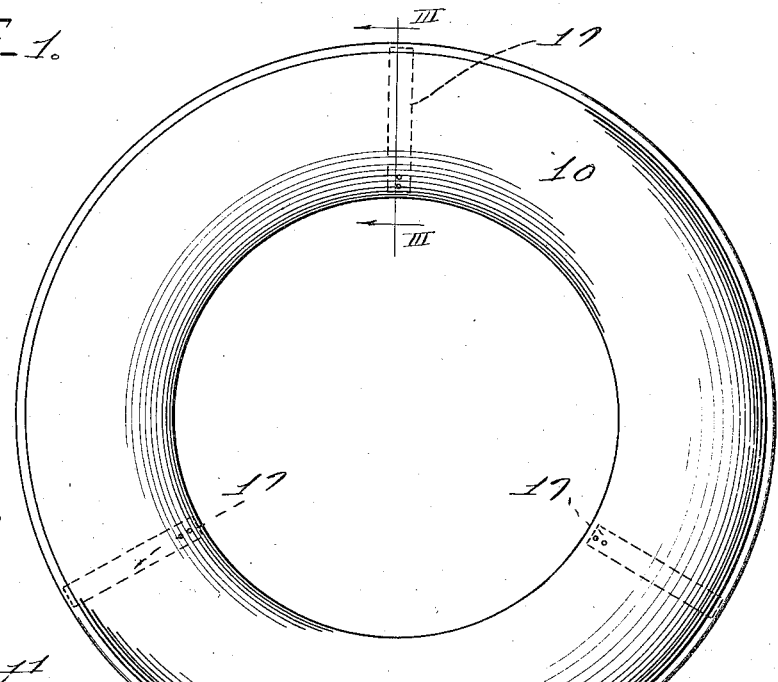
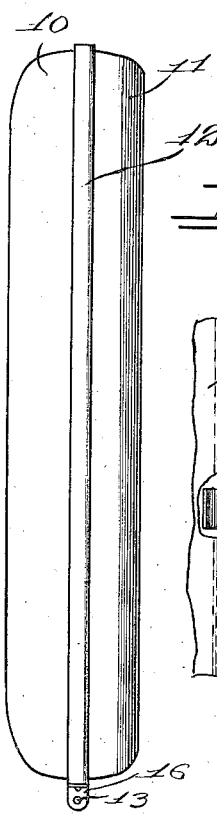
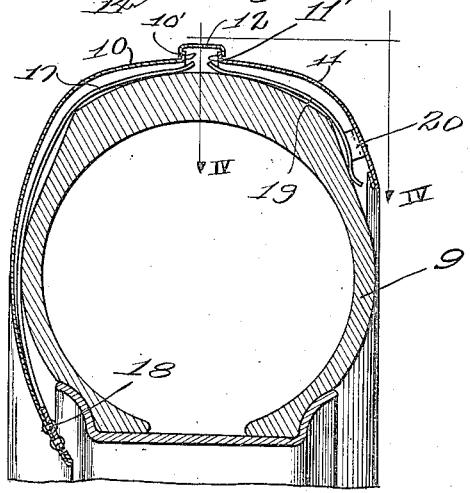
Inventor
George Albert Lyon.
by Charles Ixxxxx
Attys.

Patented Sept. 17, 1935

2,014,655

UNITED STATES PATENT OFFICE 2,014,655

TIRE COVER

George Albert Lyon, Allenhurst, N. J., assignor to Lyon Incorporated, Asbury Park, N. J., a corporation of Delaware Application September 14, 1932, Serial No. 633,027

6 Claims. (Cl. 150—54)

This invention relates to tire covers and more particularly to a multi-part tire cover in which the parts are applicable to the tire from opposite sides thereof.

An object of the invention is to provide a tire cover of the above noted type together with novel means for retaining the parts of the cover in proper tire protecting position on the tire.

Another object of the invention is to provide a tire cover of the above noted type in which provision is made to enable the tire cover to accommodate itself to slight variations in size and contour of the tire disposed therein.

In accordance with the general features of the invention there is provided a tire cover including two parts one of which is applicable to the outer side of a spare tire to cover that side and substantially half of the tread or outer periphery of the tire and the other part of which is applicable to the tire from the other side thereof to cover the remaining half of the tire tread, both parts being joined together at substantially the median plane of the tire by means of a split band disposed between and connecting the margins of the parts adjacent the median plane of the tire.

Another feature of the invention relates to the provision of means inside of the above described cover parts for yieldably engaging the outer periphery of the tire so as to cause the cover to readily accommodate itself to slight variations in contour and size of the tire.

Other objects and features of this invention will more fully appear from the following detail description taken in connection with the accompanying drawing which illustrates a single embodiment thereof and in which Figure 1 is a side view or elevation of a tire cover embodying the features of this invention;

Figure 2 is an end view of the cover shown in Figure 1;

Figure 3 is an enlarged cross sectional view taken on substantially the line III—III of Figure 1 looking in the direction indicated by the arrows and showing the cover applied to a spare tire; and Figure 4 is a fragmentary detail view taken on substantially the line IV—IV of Figure 3 looking downwardly and illustrating the construction of one of the springs in the rear part of the tire cover.

In the drawing:

The reference character 10 designates generally an outer part of the cover which is cylindrical and of curved transverse cross section. This part 10 as best shown in Figure 3 is shaped for disposition over an outer side wall of a spare tire 9 as well as for disposition over a little less than half of the outer periphery or tread of the tire 9. The innermost margin of this part 10 has an outwardly turned edge 10' for cooperation with a split band 12 to be described hereinafter.

The cover also includes a rear part 11 which is cylindrical in form and is also of a curved transverse shape so as to accommodate itself to the contour of the rear half of the outermost periphery or tread of the tire 9. This part 11 also has an outwardly turned marginal edge 11' for cooperation with the split rim 12. The innermost edges of these two parts 10 and 11 may be turned as clearly shown in Figure 3 so as to preclude one handling the same from cutting his or her hands.

The two parts 10 and 11 may each comprise split parts or may be in the form of a continuous circle as shown in the drawing depending upon whether the cover is to be used on a spare tire in a fenderwell or on a spare tire at the rear of an automobile. If the cover is to be used on a rear spare tire then it should preferably be in the form of a continuous circle since substantially the entire wheel is visible. On the other hand if the cover is to be used on a fenderwell installation it of course follows that a part of the spare tire will be disposed in the fenderwell and it is not necessary that that part which is so enclosed by the fenderwell be covered by the cover in which event the cover parts may be formed open at the bottom or in other words not in the form of a continuous circle.

The split rim 12 hereinbefore referred to has a U-shaped cross section as shown in Figure 3 so as to enable its lateral legs to cooperate with the two outwardly turned edges 10' and 11' of the two parts 10 and 11 respectively. This split rim 12 extends circumferentially about the cover at the median line of the tire and is drawn into tight cooperation with the edges 10' and 11' by means of a turnscrew 13 having thereon a knurled member 14 for rotating the same. The ends of this turnscrew 13 are threaded in opposite directions and cooperate with threaded openings in two spaced brackets 15 and 16 secured to the ends of the split rim or strap 12. It will be evident that by turning the screw 13 through the means of the knurled member 14 it is possible to spread or draw together the ends of the split strap 12 whereby it may be removed or applied to the two cover parts 10 and 11.

In order to enable this cover to accommodate itself to slight variations in size and contour of the tire therein I provide each of the cover parts with spring means for yieldably engaging over the outer periphery of the tire.

As best shown in Figures 1 and 3 the cover part 10 has secured to it on its inner side three equidistantly spaced curved spring-like elements 17 for yieldably engaging over the front half of the outermost periphery and tread of the tire 9. Each of these spring-like elements 17 is fastened at one end as indicated at 18 to the inner margin of the cover part 10 and has its other end curved outwardly and inwardly over the tire tread so as to resiliently engage the same when the tire cover part 10 is pressed into position over the outer part of the spare tire 9. In other words these three springs 17 are forced outwardly by the tread of the tire when the tire cover is inserted in the part 10 so that these three elements yieldably engage the tire and tend to center the cover part 10 thereon as well as to prevent rattle between this part and the tire 9.

Each of the spring elements 17 as will be noted in Figure 1 is in the direction of its major length substantially straight as distinguished from being offset as is the case with the spring elements 19 on the cover part 11. The spring elements 19 on the cover part 11 may also be three in number and may be equidistantly spaced apart as is the case with the three elements 17. However in view of the fact that these elements 19 are not as long as the elements 17 it follows that they would not have as great a degree of flexing if they were anchored to the inner edge of the part 11 as the elements 17 which extend inwardly of the tire to a further extent than do the elements 19. Accordingly I provide each of the elements 19 with an offset portion 20 as shown in Figure 4 which is suitably anchored by means of welding or the like to the inner margin of the part 11. This offset mounting of the spring element 19 permits it to flex throughout substantially its entire length whereby it is free to readily accommodate itself to the rear half of the tire tread as the cover part 11 is being applied to the tire.

It should also be noted that the outermost extremities of the spring-like elements 17 and 19 may be turned outwardly slightly into the space separating the edges 10' and 11' of the cover parts 10 and 11 so that the outer edges of these spring-like elements 17 and 19 will not bite into the protuberances of the tread as the cover parts are being applied to the tire from the opposite sides thereof.

Now I desire it understood that although I have illustrated and described in detail the preferred embodiment of the invention, the invention is not to be thus limited but only insofar as defined by the scope and spirit of the appended claims.

I claim as my invention:

1. A tire cover arranged to cover the tread of a tire, and resilient means on the interior of the cover for spacing the cover from the tread and enabling the cover to fit treads of different widths and diameters, said means comprising springs mounted as cantilevers and arranged to yield in planes substantially normal to the median plane of the tire when the cover is being applied thereto, said springs having free ends adjacent the corresponding plane of the cover to guide and center the cover as the same is applied in proper tire protecting position, said free ends being turned outwardly and said cover being recessed to receive said free ends whereby interference due to biting of said ends against the tire is avoided as the cover is shoved onto the tire.

2. A tire cover arranged to cover the tread of a tire, and resilient means on the interior of the cover for spacing the cover from the tread and enabling the cover to fit treads of different widths and diameters, said means comprising springs mounted as cantilevers and arranged to yield in planes substantially normal to the median plane of the tire when the cover is being applied thereto, said springs having free ends adjacent the corresponding plane of the cover to guide and center the cover as the same is applied in proper tire protecting position, said free ends being turned outwardly and said cover being recessed to receive said free ends whereby interference due to biting of said ends against the tire is avoided as the cover is shoved onto the tire, said cover including a portion for disposition over a side wall of the tire.

3. A tire cover arranged to cover the tread of a tire, and resilient means on the interior of the cover for spacing the cover from the tread and enabling the cover to fit treads of different widths and diameters, said means comprising springs mounted as cantilevers and arranged to yield in planes substantially normal to the median plane of the tire when the cover is being applied thereto, said springs having free ends adjacent the corresponding plane of the cover to guide and center the cover as the same is applied in proper tire protecting position, said free ends being turned outwardly and said cover being recessed to receive said free ends whereby interference due to biting of said ends against the tire is avoided as the cover is shoved onto the tire, said cover including a circular protuberance arranged at said plane thereof to provide a recess for unobstructedly receiving said free ends.

4. A tire cover comprising a circular part conforming in cross-section to a side wall and a second circular part conforming in cross-section to the tread of a tire and having its free margin disposed inwardly of the outer periphery of the tread when the cover is in proper tire protecting position, to thereby cooperate with the first part in preventing accidental removal of the coved from the tire, the second part comprising separate annular portions providing between them a circular space and having adjacent said space outwardly projecting flanges, and a substantially channel-shaped flexible split band arranged in covering relation to said space with the sides thereof straddling said flanges to provide a substantially circular hollow, the parts of said cover being formed of substantially larger dimensions than the largest tire to be accommodated thereby, and resilient means connected to said cover and arranged to space the same from the tire, said means projecting between the tread and said band and arranged to be moved toward the hollow as the cover portions are shoved onto the tire, said band being contractible to firmly hold said portions in position and expansible to enable the cover to be disassembled from the tire.

5. As an article of manufacture, a spare tire cover including a pair of arcuate parts for application over the outer periphery of the tire, means disposed over the outer periphery of the tire for pulling the parts together and for holding them on the tire, one of said parts having disposed on its inner side a tread engaging spring element secured to said one part and having an outer end free and extending transversely of the tire tread in a plane at a substantial angle to the median plane of the tire, said free end of the element being flexible radially from and toward the central axis of the tire so as to accommodate variations in the size and contour of the tire and said element being of such extent as to hang one part on the tire during application of the cover to the tire.

6. As an article of manufacture, a spare tire cover including a pair of arcuate parts for application over the outer periphery of the tire, means disposed over the outer periphery of the tire for pulling the parts together and for holding them on the tire, one of said parts having disposed on its inner side a tread engaging spring element secured to said one part and having a free portion formed to hook transversely over the tread at a substantial angle to the median plane of the tire to such an extent as to hang said one part from the tire pending pulling together of said parts, said free portion being flexible radially from and toward the central axis of the tire so as to accommodate variations in the size and contour of the tire.

GEORGE ALBERT LYON.